US011408861B2

(12) United States Patent
Heckel et al.

(10) Patent No.: US 11,408,861 B2
(45) Date of Patent: Aug. 9, 2022

(54) TRANSDUCER AND TRANSDUCER ARRANGEMENT FOR ULTRASONIC PROBE SYSTEMS, ULTRASONIC PROBE SYSTEM AND INSPECTION METHOD

(71) Applicant: Bundesrepublik Deutschland, vertreten durch den Bundesminister für Wirtschaft und Energie . . ., Berlin (DE)

(72) Inventors: Thomas Heckel, Kleinmachnow (DE); Rainer Boehm, Rietz-Neuendorf (DE)

(73) Assignee: BUNDESREPUBLIK DEUTSCHLAND, VERTRETEN DURCH DEN BUNDESMINISTER FÜR WIRTSCHAFT UND ENERGIE, Berlin (DE)

( * ) Notice: Subject to any disclaimer, the term of this patent is extended or adjusted under 35 U.S.C. 154(b) by 130 days.

(21) Appl. No.: 16/817,862

(22) Filed: Mar. 13, 2020

(65) Prior Publication Data
US 2020/0292504 A1   Sep. 17, 2020

(30) Foreign Application Priority Data
Mar. 13, 2019   (DE) .......................... 102019106427.9

(51) Int. Cl.
*G01N 29/07* (2006.01)
*G01N 29/22* (2006.01)
*G01N 29/24* (2006.01)

(52) U.S. Cl.
CPC ......... *G01N 29/2487* (2013.01); *G01N 29/07* (2013.01); *G01N 29/225* (2013.01);
(Continued)

(58) Field of Classification Search
CPC .... G01N 29/043; G01N 29/265; G01N 29/07; G01N 29/225; G01N 29/262;
(Continued)

(56) References Cited

U.S. PATENT DOCUMENTS 4,409,982 A    10/1983   Plesset
4,694,700 A *   9/1987   Maerfeld ............ G01S 7/52063
                                                             73/625
(Continued)

FOREIGN PATENT DOCUMENTS

CN      104101653      * 10/2014      ............ G01N 29/24
DE     2118595 A1      11/1971
(Continued)

*Primary Examiner* — Jacques M Saint Surin
(74) *Attorney, Agent, or Firm* — Bachman & LaPointe, P.C.

(57) ABSTRACT

Described are a transducer made of at least three transducer elements which approximate a sector of an elementary wave with a virtual point source, and a transducer arrangement with three transducers made of at least three transducer elements, wherein the transducers, in the cross section, are disposed along the shorter base and the two non-parallel legs of a virtual trapezoid. Moreover, the invention relates to an ultrasonic probe system comprising the transducer arrangement according to the invention and an inspection method using a transducer made of at least three transducer elements, with the number of transducer elements experiencing a virtual increase.

18 Claims, 5 Drawing Sheets

(52) U.S. Cl.
CPC . *G01N 2291/051* (2013.01); *G01N 2291/056* (2013.01); *G01N 2291/106* (2013.01)

(58) Field of Classification Search
CPC ............ G01N 29/2487; G01N 29/221; G01N 2291/105; G01N 2291/056; G01N 2291/044; G01N 2291/2623; G01N 2291/106; G01N 2291/0289; G01N 2291/051
USPC .......................................................... 73/598
See application file for complete search history.

(56) References Cited

U.S. PATENT DOCUMENTS

| | | | |
|---|---|---|---|
| 6,725,721 B2* | 4/2004 | Venczel | G01N 29/27 73/622 |
| 2007/0151375 A1 | 7/2007 | Kennedy et al. | |
| 2008/0045837 A1* | 2/2008 | Ahn | G01S 7/52085 600/459 |
| 2011/0295123 A1* | 12/2011 | Feleppa | A61B 8/12 600/447 |
| 2015/0080727 A1* | 3/2015 | Specht | G01S 15/8997 600/443 |
| 2015/0122029 A1 | 5/2015 | Suzuki et al. | |
| 2016/0205474 A1* | 7/2016 | Oellers | H04R 3/14 381/17 |

FOREIGN PATENT DOCUMENTS

| | | | | |
|---|---|---|---|---|
| DE | 102008002394 A1 | 10/2009 | | |
| WO | WO 2015/054795 | * | 4/2015 | ............. G01S 15/89 |

\* cited by examiner

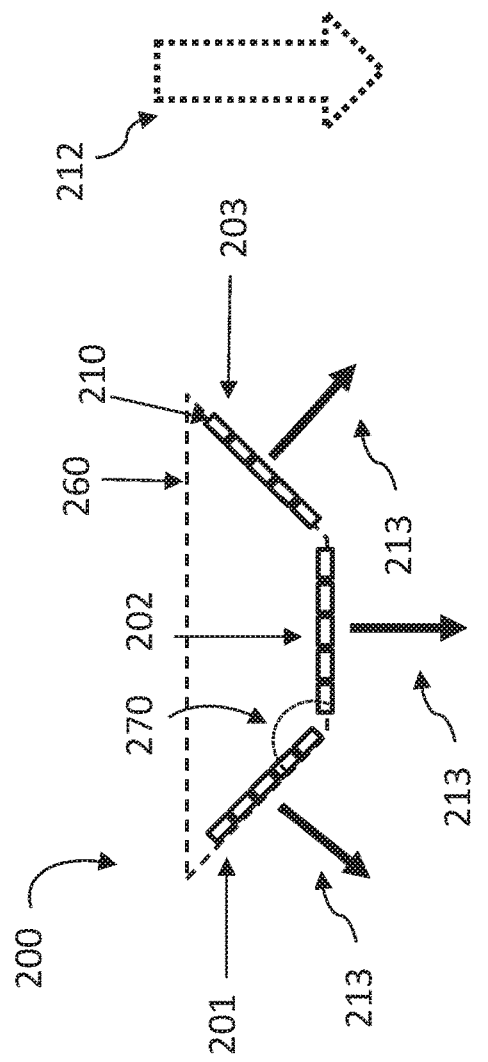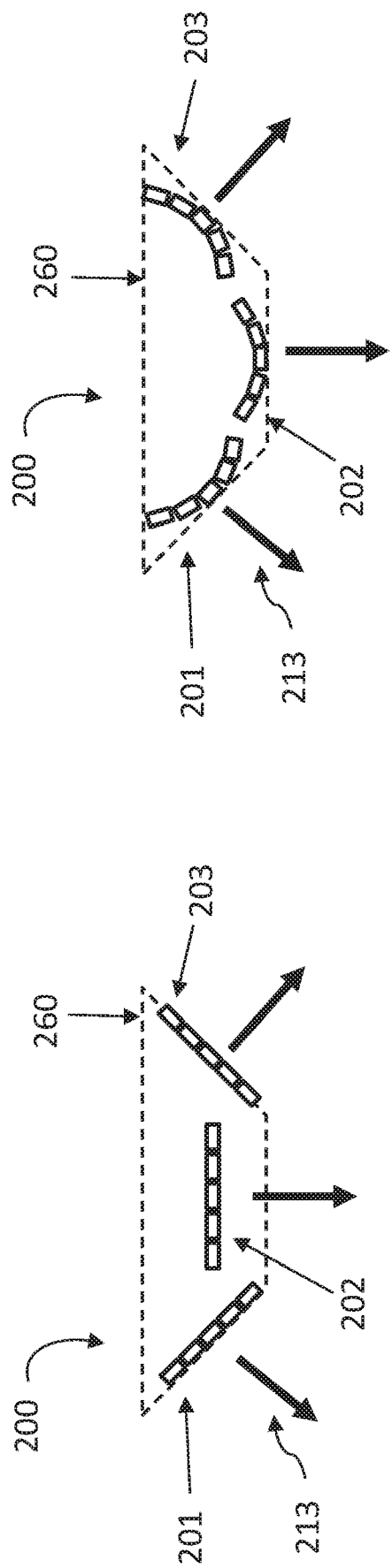

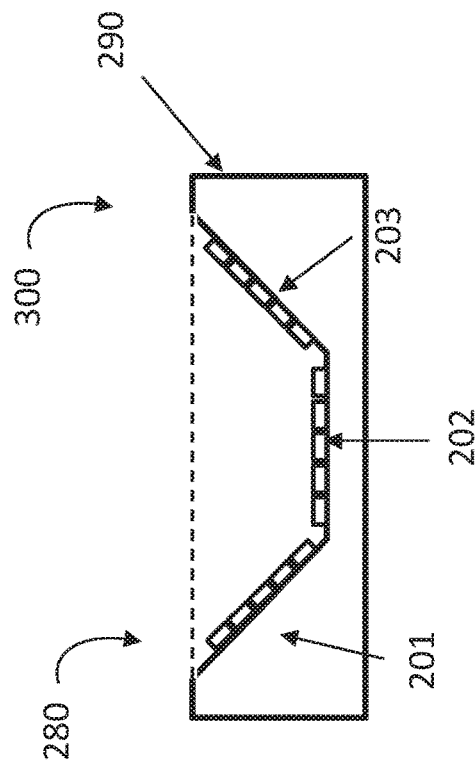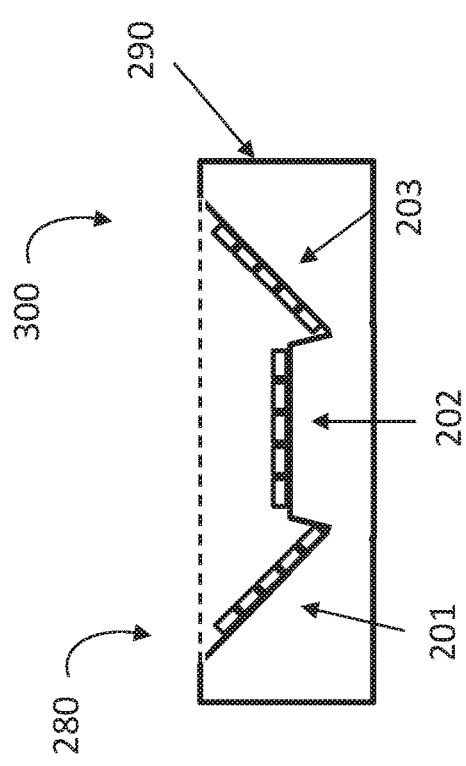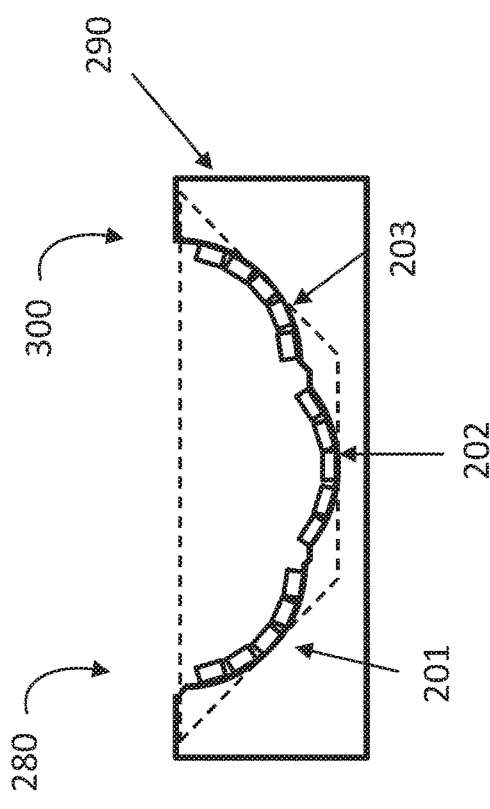

TRANSDUCER AND TRANSDUCER ARRANGEMENT FOR ULTRASONIC PROBE SYSTEMS, ULTRASONIC PROBE SYSTEM AND INSPECTION METHOD

BACKGROUND OF THE INVENTION

The present invention relates to transducers and transducer arrangements for ultrasonic probe systems, an ultrasonic probe system and inspection methods for detecting defects in a material, particularly in rails.

Ultrasonic inspection has proven its worth for nondestructive testing of materials, particularly in the interior and at inaccessible surfaces. To this end, an ultrasonic transducer, which is able to transmit and receive ultrasonic pulses, is guided over an accessible surface of the material to be inspected, with a coupling medium such as water or oil usually being located between the ultrasonic transducer and the surface of the material. A connected device generates the electrical transmission pulses and receives the electrical signals from the ultrasonic transducer, which arise there if an echo reflected or scattered at the back wall or a defect of the material, for example, arrives at said ultrasonic transducer. By way of example, the signal can be represented in the form of the time curve of the amplitude. For testing laid railroad tracks, use is made of rail testing trains, in particular, which have a multiplicity of ultrasonic probes that scan the rails. An attempt is made to detect as many faults as possible by way of a multiplicity of insonation directions from different points.

One development of ultrasound technology is the phased-array technique or group emitter technique, in which a plurality of different angles can be realized using a phased-array probe. In general, the phased-array technique places high demands on the device technology and requires longer inspection times in comparison with the inspection using a plurality of fixed-angle probes operating in parallel.

SUMMARY OF THE INVENTION

The present invention describes a simplified ultrasonic probe system and an improved inspection method for detecting faults in a material, particularly in rails. Moreover, transducers and transducer arrangements for an ultrasonic probe system are presented, which promote the simplified structure and effective functionality of the latter.

By way of example, the transducers according to the invention facilitate a high energy influx into the material to be inspected and facilitate simultaneous coverage of a plurality of insonation angles at the same time. Since a defect in the material can only be detected if the echo therefrom is also received, the geometric arrangement between transmitter, receiver and the defect is moreover decisive. The transducer arrangement according to the invention allows simultaneous coverage of a plurality of insonation angles and largely prevents the superposition of soundwaves that are coupled into the material by different transducers. Moreover, the transducer arrangement according to the invention can be housed in only a single probe or in a few probes and thereby causes a significantly simplified structure of the ultrasonic probe system according to the invention in comparison with conventional ultrasonic systems, without fewer inspection angles being considered during the inspection of a material in this case.

The inspection method according to the invention for detecting defects in a material can already be realized with a small number of transducer elements and therefore also permits the use of the transducers according to the invention, the transducer arrangement according to the invention and/or the ultrasonic probe system according to the invention, each of which are likewise already functional if there are at least three transducer elements. Moreover, an improved presentation of results can be realized by the inspection method according to the invention.

BRIEF DESCRIPTION OF THE DRAWINGS

Embodiments and aspects of the invention will be explained in more detail below with reference to the figures. In the figures:

FIGS. 2, 3 and 4 each show a schematic view of the transducer arrangement of an embodiment according to the invention;

FIGS. 5, 6 and 7 each show a schematic view of the transducer arrangement in a probe in an embodiment according to the invention;

DETAILED DESCRIPTION

Figure 1:
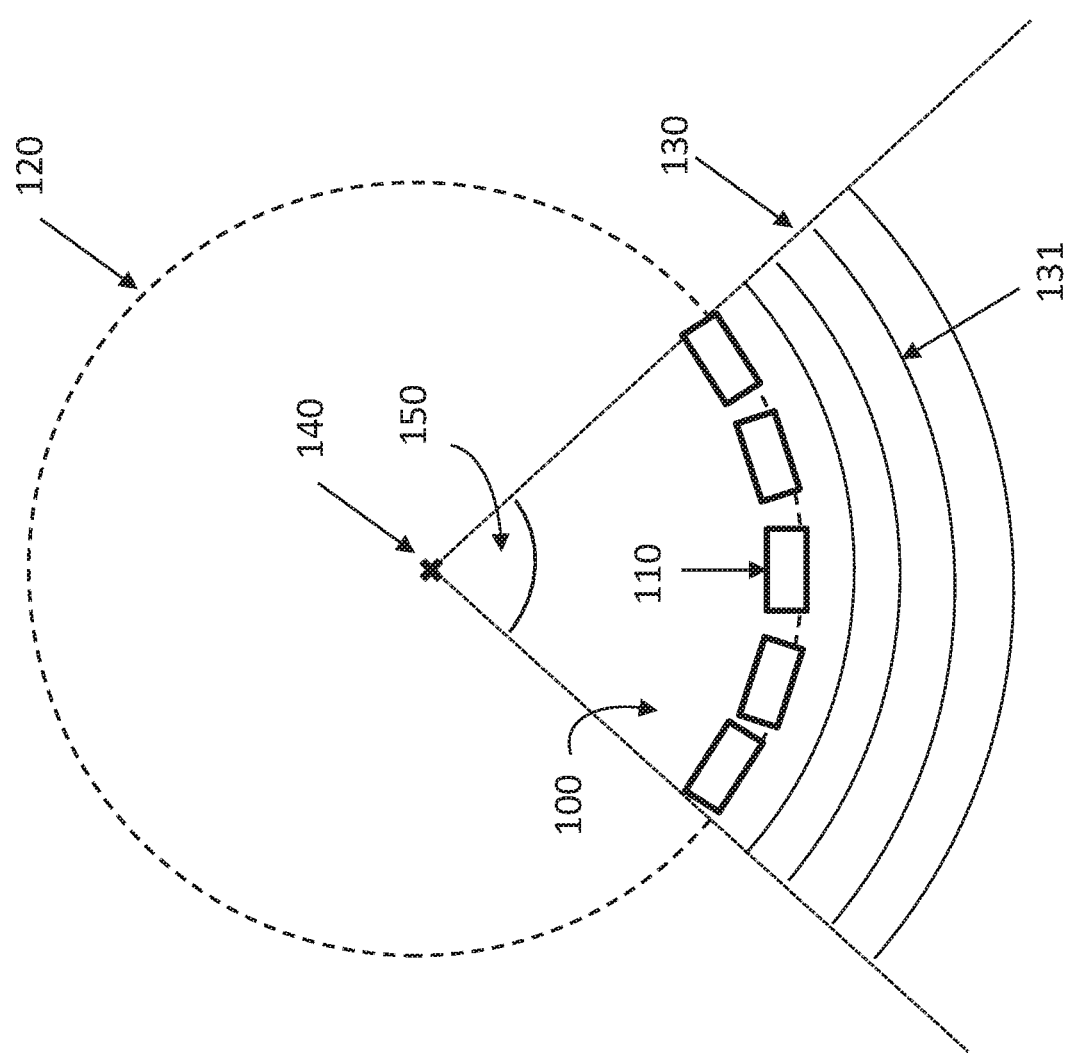
FIG. 1 shows, in exemplary fashion, a schematic view of a transducer according to the invention with 5 transducer elements.
Figure 8:
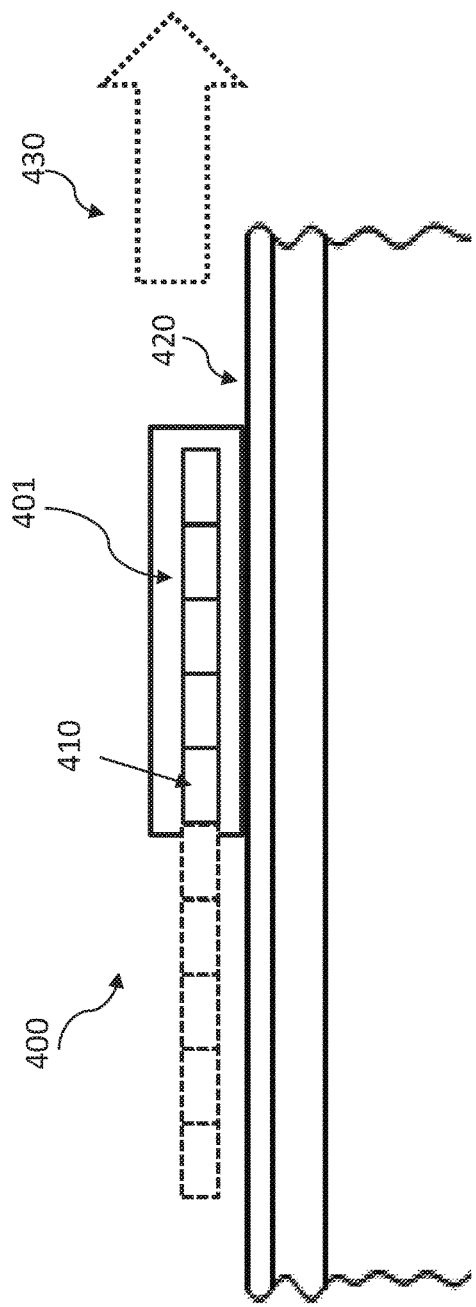
FIG. 8 shows, in exemplary fashion, a schematic view of a virtual increase in a number of transducer elements.

FIG. 1 shows an embodiment of a transducer 100 according to the invention comprising 5 transducer elements 110, which are disposed on a circular arc of a virtual circle 120. Consequently, the transducer elements 110 form a curved linear array (1D array). The transducer elements 110 serve to transmit and receive soundwaves and, in particular, can be ultrasonic transducer elements such as piezo-elements, for example. According to the invention, the arrangement of the transducer elements 110 is designed in such a way that the soundwaves emitted by the transducer elements 110 are overlaid in such a way that they approximate a sector of an elementary wave 130, the virtual point source 140 of which is located at the center of the virtual circle 120. Here, an elementary wave is understood to mean a circular or spherical wave which propagates in all directions from one point. Consequently, the transducer 100 according to the invention emulates part of a concentric wavefront of a point source, which would be situated at a distance, and in turn generates a sector of concentric wavefronts 131, which would correspond to the concentric wavefronts of the point source at an even greater distance from the point source.

The advantage of this arrangement of transducer elements 110 consists in the transducer 100 being able to generate a higher energy density in comparison with an actually realizable approximately punctiform sound source. The energy of an elementary wave is distributed over an ever greater area with increasing distance from the point source; the energy density or power density decreases with the inverse square of the distance $1/r^2$ in the process. By way of example, this means that the power density reduces to a quarter of the original value when doubling the distance from the point source (from the transmitter).

However, by approximating a virtual point source, the transducer 100 according to the invention at the same time facilitates the application of simple algorithms that are restricted to usually punctiform transducers. In particular, the transducer according to the invention facilitates the use of the SAFT algorithm, in which only a few additional parameters have to be taken into account.

Depending on whether a monostatic or bistatic arrangement is considered, the SAFT algorithm usually assumes only one or two small transducer elements, the spatial coordinates of which are known. The transducer 100 according to the invention allows the use of an adapted SAFT algorithm, which also includes, for example, the distance of the transducer 100 from the virtual point source 140 and the intensity decrease. At the same time, the transducer 100 can be used to sound a higher energy density or intensity into a material than would be permitted by a single point source. This results in a stronger excitation and response of the insonated material.

The transducer should have at least three transducer elements 110 in order to be able to approximate the sector of the elementary wave 130, the approximation to an elementary wave with a point source becoming more accurate with increasing numbers of transducer elements 110 in the transducer. However, since, in practice, each transducer element will produce a data record in the case of reception, i.e., if the echo of the emitted soundwaves is received again, it is expedient to restrict the number of transducer elements 110 and preferably use no more than 16 transducer elements 110 for the transducer. The transducer particularly preferably has 5 to 10 transducer elements 110. In particular, 7 transducer elements 110 were found to be particularly advantageous since 7 transducer elements are able to approximate the sector of the elementary wave 130 relatively well and, at the same time, still leave a possible produced data record and the outlay for the device technology manageable.

As a result of arranging the transducer elements 110 of the transducer 100 according to the invention, there is a divergence in the emitted sound field in the direction facing away from the virtual point source 140, as a result of which there is "natural" defocusing of the emitted sound field in relation to its geometric aperture. As a rule, a point source is divergent and has no focus. By contrast, an arrangement of sources restricted to a solid angle (restricted half-emitter) always has a natural focus on account of the geometric dimensions and the emitted wavelength. The arrangement of the transducer elements with the approximation of the (solid angle-restricted) elementary wave counteracts the natural focusing, as result of which the natural focus "defocuses" (in non-directed fashion) in the direction of the sound field of a point source. The defocusing, i.e., broadening of the sound field (with the goal of generating a quasi solid angle-restricted elementary wave), facilitates insonation and inspection of a broader angular range in a material located in the direction facing away from the virtual point source 140. Additional sound field broadening (optimization of the quasi solid angle-restricted elementary wave) can be obtained by delayed (electronic) driving of the individual transducer elements 110 of the transducer 100 so that the individual soundwaves are emitted with a slight delay. For the purposes of broadening the sound field, the outermost transducer elements of the transducer should experience the greatest delay to this end, while the delay values reduce toward the center of the transducer 100.

Moreover, delayed driving of the individual transducer elements 110 can be used to bring about individual propagation time corrections, particularly in order to compensate production-related or material-technical variations (individual propagation time/phase correction for compensating production inaccuracies). By way of applying a relative delay of the transmission pulses with respect to one another (of the order of the coherence length of the transmission pulse), the properties of the sound field generated by the transducer 100 according to the invention can be improved during transmission, for example such that even transducer elements 110 that are not disposed in an ideal circular arc shape efficiently approximate a sector of an elementary wave 130.

In principle, the transducer elements 110 themselves could also have an arcuate form in order to optimize the arrangement on the circular arc.

In order to cover a certain angular range in a material, the refraction at possible interfaces (e.g., between steel, coupling medium and acrylic glass) has to be taken into account, just like the alignment of the transducer itself. The arrangement of the transducer elements on the circular arc is also relevant. The circular arc is bounded by the outermost edges of the transducer and defines a central angle 150, as illustrated in exemplary fashion in FIG. 1. The central angle 150 of the circular arc can vary depending on the desired angular range in the material that should be subject to insonation, the alignment of the transducer 100 and the refractions to be taken into account, but is preferably no less than 15° and no more than 80°, particularly preferably no less than 20° and no more than 70° and very particularly preferably no less than 25° and no more than 40°.

A further aspect of the invention relates to a transducer arrangement 200 for an ultrasonic probe system, comprising a first, a second and a third transducer 201, 202, 203 for transmitting and receiving soundwaves, wherein each transducer has at least three transducer elements 210.

In the cross section, the transducer arrangement according to the invention can be visualized on the basis of a virtual trapezoid 260, the virtual trapezoid 260 having bases of different length and non-parallel legs. In an advantageous embodiment, the internal angles 270 at the shorter base of the virtual trapezoid 260 each have a magnitude of 95° to 175°, particularly preferably 100° to 170° and very particularly preferably 110° to 165°. Moreover, the virtual trapezoid 260 is preferably an isosceles trapezoid.

As shown in FIGS. 2, 3 and 4 in exemplary fashion, the transducer elements of each transducer are arranged to form a linear array, wherein the linear array can be, e.g., straight, as shown in FIGS. 2 and 3, or else curved, as illustrated in exemplary fashion in FIG. 4. In the cross section, the transducer elements of the second transducer 202 are substantially disposed along a straight line that is parallel to the bases of the virtual trapezoid 260. By contrast, the transducer elements of the first and of the third transducer 201, 203 are disposed substantially along the legs of the virtual trapezoid 260.

Here, the arrangement of the transducer elements 210 of a transducer along, or substantially along, a virtual line, i.e., the straight line or the legs, describes, in particular, the longitudinal direction of the respective transducer, that is to say of the linear array, i.e., the direction along which the transducer elements of a transducer are strung together. Thus, the phrase "substantially along a straight line" or "substantially along the legs" should not be understood to mean that all transducer elements of a transducer element must lie directly on the straight line or the legs. By way of example, in the case of a curved linear array, the legs of the virtual trapezoid 260 could also each correspond to a tangent at the center of a circular arc on which the transducer elements 210 of the first and third transducer 201, 203 are disposed, and the straight line could correspond to a tangent at the center of a circular arc on which the transducer elements 210 of the second transducer 202 are disposed. In the case of an odd number of rectangle-shaped transducer elements, the central transducer element would thus lie on the virtual line, for example. In the case of a straight linear transducer (straight linear array), as illustrated in FIGS. 2 and 3, for example, the transducer elements can be located directly on the respective virtual line; the case of the curved linear transducer (curved linear array) is shown in exemplary fashion in FIG. 4.

The virtual trapezoid serves as an auxiliary line for describing the transducer arrangement and should be designed within a realistic framework such that, for example, the length of the legs of the virtual trapezoid approximately corresponds to the length of the first and third transducer and the length of the shorter base approximately corresponds to the length of the second transducer (cf. FIGS. 2, 3 and 4), for example in order to preclude an unnecessary enlargement in the installation space required for the transducer arrangement.

Figure 9:
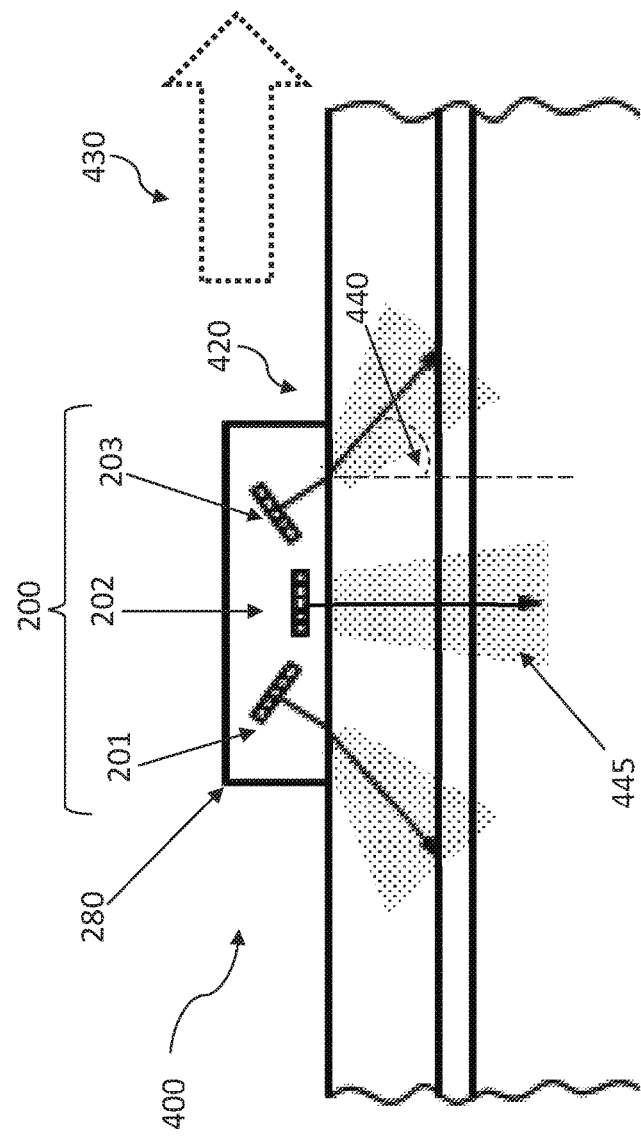
FIG. 9 shows a schematic view of a probe in an embodiment according to the invention.
Figure 10:
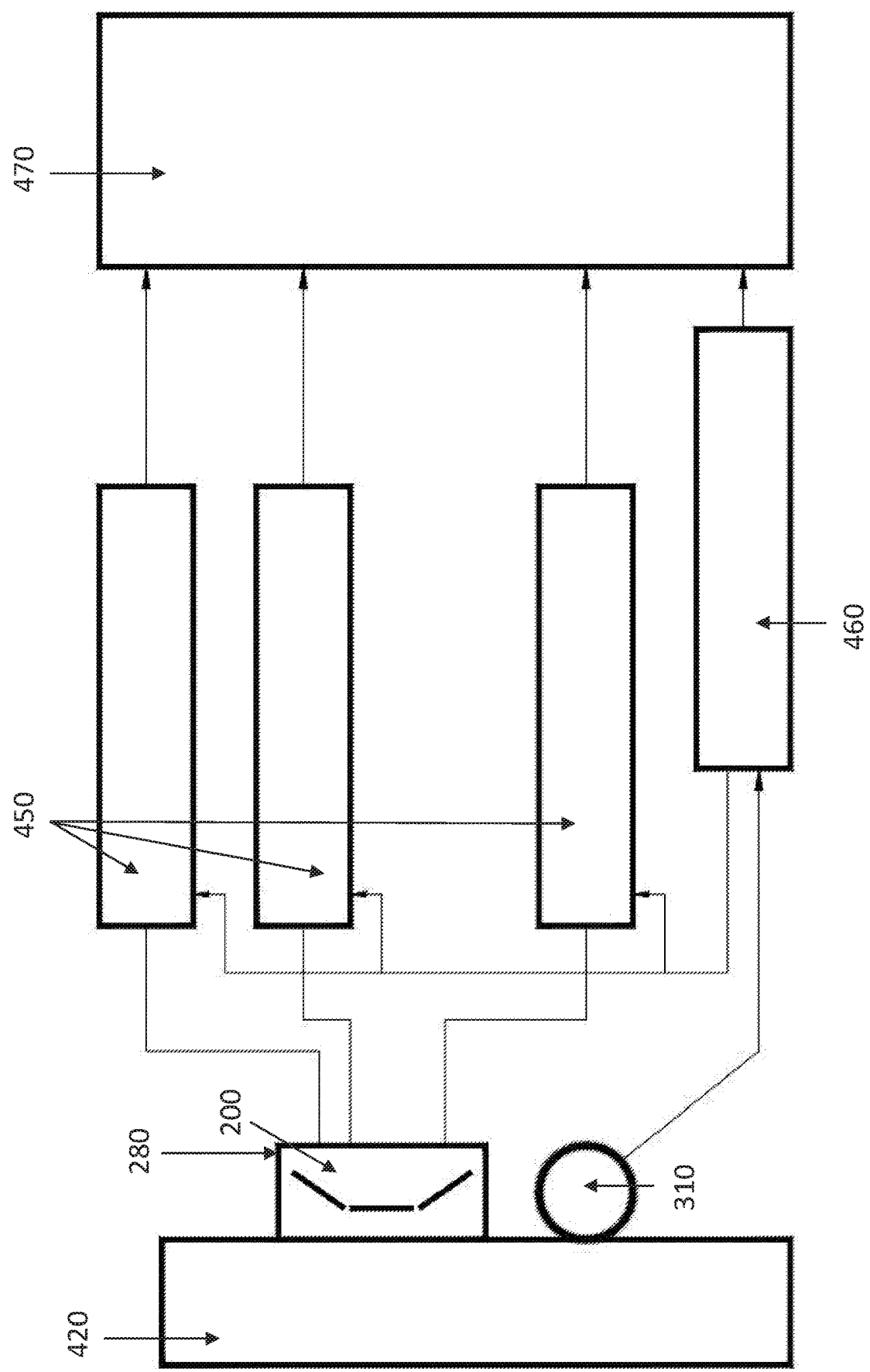
FIG. 10 shows a block diagram of a multichannel system for controlling an ultrasonic probe system according to the invention.

In general, the transducers 201, 202, 203 sound along a normal direction, as illustrated in exemplary fashion as sound direction 213 in FIGS. 2, 3 and 4. That is to say, the transducers sound substantially perpendicular to their longitudinal direction, with each normal direction being surrounded by a broader sound field in reality, as indicated in FIG. 9, for example. Preferably, the transducers 201, 202, 203 are each aligned in such a way that they can sound entirely or at least partly in a direction 212, which extends from the longer base of the virtual trapezoid to the shorter base of the virtual trapezoid 260. If the second transducer 202 is substantially disposed along the shorter base of the virtual trapezoid 260, this would mean, for example, that the first, second and the third transducer 201, 202, 203 each sound away from the interior of the virtual trapezoid 260. Then, in particular, a surface of a material to be inspected would be located opposite the shorter base of the virtual trapezoid 260.

The second transducer 202 can be disposed in front of the first transducer 201, between the first and third transducer 201, 203 and after the third transducer 203 along a longitudinal direction of the cross section. In an advantageous embodiment, the second transducer 202 is disposed between the first and third transducer 201, 203 along a longitudinal direction of the cross section in order to keep both the installation space required for the transducer arrangement and the coupling surface as small as possible in a subsequent application of the transducer arrangement. As illustrated in exemplary fashion in FIGS. 2, 3 and 4, the sequence of the transducers in the cross section, from left to right, is consequently as follows: first transducer 201, second transducer 202, third transducer 203. Expressed differently, the second transducer 202 is located directly on or above or below the shorter base of the virtual trapezoid. The arrangement above the shorter base provides the second transducer 202 with a comparatively long delay path such that, during a subsequent application, an entry echo repetition is shifted to longer time intervals, and may therefore be advantageous.

Preferably, the second transducer 202 is disposed in the interior of the virtual trapezoid 260 in order, for example, to not unnecessarily increase the installation space, to be precise in order to sound away from the longer base of the virtual trapezoid 260. An arrangement of the second transducer along the shorter base of the trapezoid, as illustrated in FIG. 3 and FIG. 4, for example, is particularly advantageous.

In an advantageous configuration, the first, second and the third transducer 201, 202, 203 each comprise at least three transducer elements 210 in order to be able to approximate a plane wave or an elementary wave by way of superposition of the emitted soundwaves of the individual transducer elements 210 of a transducer. In order to produce a manageable data record in the case of reception, it is currently considered expedient to use no more than 16 transducer elements per transducer, wherein, in theory, a significantly higher number of transducer elements, e.g., 128 transducer elements, could also find use. Particularly preferably, the first, second and third transducer have 5 to 10 transducer elements 210. In particular, 7 transducer elements 210 were found to be particularly advantageous since the quality of the generated soundwave, the generated data record and the outlay for the device technology are balanced in this case.

The first and the third transducer 201, 203 are preferably identical in structure, i.e., for example comprise the same number of transducer elements, and are arranged in mirror-symmetric fashion in the cross section.

In particular, the first, second and third transducer 201, 202, 203 can be a transducer 100 according to the invention, as described further above.

The transducer arrangement 200 can be used in an ultrasonic probe system 300. The ultrasonic probe system 300 according to the invention may comprise one probe 280 or a plurality of probes, in particular 3 probes. The use of only three probes, or even of only one probe, reduces the complexity and the number of probes in relation to conventional systems. Since it is possible to dispense with a multiplicity of probes when inspecting a material, the ultrasonic probe system 300 according to the invention can be realized in significantly smaller installation space than conventional inspection systems.

By way of example, 8 to 10 probes per rail are housed in an installation space of at least one meter in length in the case of conventional ultrasonic inspection of rails with the aid of a rail vehicle, whereas the ultrasonic probe system 300 according to the invention or the transducer arrangement 200 according to the invention also finds space on a rail vehicle in an installation space with a length of significantly less than one meter. The ultrasonic probe system 300 can be realized in an installation space with a length of approximately 20 cm and a width of 3 cm.

If the transducer arrangement 200 is divided among three probes, with each probe comprising one of the three transducers, this offers the advantage of not needing to replace the entire transducer arrangement in the case of one defective transducer; instead, individual transducers of the transducer arrangement 200 according to the invention can be substituted. Since the first and the third transducer 201, 203 can be realized to be identical in structure, this can moreover save production and storage costs.

By contrast, housing the transducer arrangement 200 in a single probe facilitates a compact and simple structure of the ultrasonic probe system 300 and allows a comparatively simple replacement of the transducer arrangement 200 of the ultrasonic probe system 300 in the case of a defect or the like.

The ultrasonic probe system 300 may have a delay path, for example in the form of a probe wedge. The transducer arrangement 200 can be affixed to the probe wedge 290, which may consist of one or more parts, for example. Preferably, the probe wedge 290 models the shape of the transducers 201, 202, 203 and of the transducer arrangement 200 in such a way that whole area adhesive bonding between the probe wedge 290 and one side of the transducers 201, 202, 203 in each case is facilitated, as shown in FIGS. 5 to 7 in exemplary fashion. Here, the transducers 201, 202, 203 are disposed in such a way that they can sound into the probe wedge 290. The material of the probe wedge 290 is preferably chosen in such a way that the speed of the longitudinal waves emitted by the transducers of the transducer arrangement is lower in the probe wedge 290 than in the material to be inspected. For the inspection of rails (rail steel), plastics, in particular, come into question, with acrylic glass and polystyrene being especially preferred. Suspending the first, second and third transducer 201, 202, 203 of the transducer arrangement 200 in, e.g., water is also conceivable for realizing a delay path.

Various insonation angles in the material to be inspected can be realized by the transducer arrangement 200 according to the invention. The insonation angle arises from the direction of propagation of the wavefronts in the material to be inspected, said wavefronts arising by the superposition of the soundwaves of the individual transducer elements 210 of a transducer, wherein the insonation angle is defined in each case in relation to a perpendicular of a surface of the material to be inspected, over which the ultrasonic probe system is guided. A perpendicular insonation, as is possible with the second transducer 202, in particular, accordingly corresponds to an insonation angle of 0°, while the mean insonation angle 440 in the case of the third transducer 203, specified in exemplary fashion in FIG. 9, corresponds to approximately 45° (or −45°).

The first, the second and the third transducer 201, 202, 203 each have different insonation angles in relation to the surface of a material to be inspected as a result of the trapezoid-like arrangement and the different orientations connected therewith. As already explained further above, the insonation angle in the normal direction (cf. sound direction 213) is surrounded by a sound field in reality, and so each of the transducers insonates an angular range in the material that covers a plurality of insonation angles. Here, the angular range 445 can be varied in each case by delayed driving of the transducer elements 210 of a transducer. By way of example, angle corrections allow the compensation of production-related or material-technical deviations from the desired angular range or the angular range can be broadened by defocusing of the sound field so that there can be reception of echoes from a greater material range and detection of defects with more strongly deviating orientations in the material.

Moreover, as described further above, defocusing of the sound field can be achieved with the aid of curved transducers, such as the transducers 100 according to the invention, for example. By arranging the transducer elements 210 on a curved path such as a circular arc, the emitted sound field diverges and causes defocusing of the emitted sound field so that a plurality of insonation angles are covered at the same time.

In contrast thereto, conventional probes, as a rule, only have a set insonation angle and a comparatively small sonic beam aperture such that different inspection angles are realized with the aid of a multiplicity of probes with various discrete insonation angles in order thus to detect differently oriented defects in the material. Here, the inspection angles describe the direction respect to the surface normal (e.g., 0°, 35°, 55° and) 70°, from which the echo is received and subsequently evaluated in each case. By contrast, the transducer arrangement 200 according to the invention facilitates a large and free selection of inspection angles, under which the material 420 to be inspected can be examined in respect of defects.

For the ultrasonic inspection of rails (rail steel), the insonation angles preferably lie between −80° and +80°. These insonation angles can be inspected at the same time using the ultrasonic probe system 400 according to the invention, the first and the third transducer preferably generating transverse waves in the material in order to cover angular ranges from ±33° to ±80° and the second transducer preferably using longitudinal waves in order to realize a "perpendicular inspection", with an angular range of approximately −33° to +33° being insonated in the material in the process. Here, the angles are each defined in relation to a perpendicular of the surface of the material to be inspected.

The simultaneous inspection of various insonation angles represents a substantial advantage over inspection systems that use a phased array technique since the latter require a new transmission and reception process for each insonation angle.

The insonation angles that are realized in the material to be inspected are influenced by various parameters. Firstly, the internal angles at the shorter base of the virtual trapezoid and hence, the angles between the first and second transducer and between the second and third transducer, for example, play a role since this sets the normal direction of the soundwaves. Secondly, the insonation angle ranges depend on the defocusing of the sound fields of the individual transducers, for example as a result of arranging the transducer elements on a curved path or delayed electronic actuation, with stronger defocusing of the sound field causing a broadening of the angular range. What internal angles have to be chosen at the shorter base of the virtual trapezoid substantially depends on the material to be examined and the material of the probe wedge (or of the delay path), which determine the speed of the soundwaves and the angle of refraction of the soundwaves at the occurring interfaces. When rails are inspected, these interfaces may occur, for example, between the probe wedge (e.g., acrylic glass) and the coupling medium (e.g., water) and the coupling medium and the rail steel.

For a probe wedge made of acrylic glass, the forward wedges, which set the angle of the first and third transducer, respectively, in relation to the surface to be inspected, may have an angle of 28° to 54° such that hardly any longitudinal waves arise in the material and work can preferably be carried out there using transverse waves. Consequently, an advantageous internal angle at the shorter base of the virtual trapezoid with a magnitude of 130° to 147° arises for the transducer arrangement. An internal angle magnitude of 156° to 163° is advantageous for a delay path made of water.

In an advantageous embodiment, a position encoder 310 is situated in the vicinity of the transducer arrangement 200. By way of example, the position encoder can be a bi-incremental rotary position encoder. The position encoder 310 can detect the relative movement of the transducer arrangement 200 in relation to the material to be inspected and can be used to determine path positions. Thus, the position encoder and, for example, a reconstruction algorithm can be used to ascertain the respective path position at which the transducers of the transducer arrangement 200 couple a sound pulse into a material to be inspected and also to ascertain the respective path position at which the transducers of the transducer arrangement 200 receive an echo signal. In order to be able to determine the path position as accurately as possible, the position encoder 310 should detect the distance traveled with an accuracy of least $\lambda/4$, where $\lambda$ describes the wavelength in the material of the soundwaves emitted by the transducer elements.

A further aspect of the invention relates to an inspection method for detecting defects in a material 420, the inspection method being suitable for rails, in particular.

Initially, a coupling means can be applied to the surface of the material 420 in conventional fashion, with water preferably being used in the case of large-scale inspections for reasons of cost and environmental protection. According to the invention, an ultrasonic probe system 400 is moved along the surface of the material 420 in a movement direction 430 within the scope of the inspection method. The ultrasonic probe system 400 according to the invention comprises at least one transducer 401 with a multiplicity of transducer elements 410, which are arranged along the movement direction 430 to form a linear array. During the movement along the surface of the material, high-frequency transmission pulses are coupled into the material 420, said transmission pulses being generated by the transducer elements 410 of the transducer 401. The input-coupled transmission pulses generate echo signals, which are caused by reflection at a defect in the material 420, and these echo signals can be received in parallel by all transducer elements 410 of the transducer 401. The analog echo signals are converted into digital data, stored and evaluated for the purposes of determining the location of the defect in the material 420.

Since the transducer elements 420 are disposed along the direction in which the transducer itself moves as well, it is possible to realize a virtual increase in the number of transducer elements 420 and hence a lengthening of the transducer 401. This virtual increase in the number of transducer elements arises during the digital data processing in particular, within the scope of which individual successive data can be evaluated together in each case.

By way of example, the transducer 401 input-couples a transmission pulse at a path position A and subsequently moves to a path position B, at which a new transmission pulse is input-coupled, and subsequently moves to a yet further path position C. The transducer 401 in each case receives echo signals between the path positions A and B and between the path positions B and C. These echo signals are converted into digital data in each case and stored. Subsequently, the digital data can be combined with one another by calculation, with the relative movement of the transducer 401 in relation to the surface of the material 420 to be inspected being taken into account. Here, the relative movement can be removed by calculation and the received signals from different path positions remain; these can be treated as if they originate from one transducer that has so many transducer elements that it extends from path position A via path position B to path position C. The assignment of path positions can be implemented by a reconstruction algorithm and can make use of the detection of the path traveled on account of the movement.

The path traveled on account of the movement can be detected at, e.g., every transmission time, preferably with a resolution of at least λ/4. Furthermore, detecting the path between the transmission times (intermediate scanning) could be expedient so as not to have to linearly interpolate the traveled path or offset between two transmission pulses. As described further above, the path can be detected with a position encoder 310, for example. Here, the transmission pulses can follow one another at certain time intervals or after certain path lengths. Path positions can be respectively assigned to the transmission pulses and the received echo signals by way of processing the digital data. By way of example, if there is a transmission pulse every 5 mm, comprehensive data records, which also allow calculation of path positions between the 5 mm intervals, arise between the transmission pulses on account of the simultaneous reception by the transducer elements.

In theory, the virtual increase in the number of transducer elements leads to an infinitely long transducer which, however, in fact need only comprise a few transducer elements.

According to the invention, the inspection method can already be carried out using three transducer elements 410. Each transducer element 410 can be involved with the reception of the echo signals and can consequently produce a data record, which is stored, following the digitization of the analog echo signals. In order to keep the totality of the data records manageable, it is advantageous if the transducer 401 has no more than 16 transducer elements 410. Particularly preferably, the transducer 401 has five to 10, particularly preferably 7 transducer elements 410.

Preferably, the transducer 401 insonates an angular range 445 in the material that covers a plurality of insonation angles defined in relation to a perpendicular of the movement direction 430 that extends through the center of the transducer 401. The angular range 445 preferably comprises the insonation angles from −33° to +33°, particularly preferably from −20° to +20°, should work be carried out with longitudinal waves, and insonation angles from +33° to +80°, particularly preferably from +35° to +70°, or from −33° to −80°, particularly preferably from −35° to −70°, should transverse waves be generated.

The individual transducer elements are excited by rectangular electrical pulses depending on the nominal frequency of the transducer with pulse widths of between 20 and 2500 ns and with voltages of up to 250 V. The location-dependent acoustic transmission pulse in the material arises from the superposition of all partial waves of the individual transducer elements. The relative time delay of the transmission pulses contributes to the sound field formation. Here, the individual pulses for the transducer elements of the transducer can be transferred in synchronous fashion or else, as described above, with a delay in relation to the transducer elements of a transducer located further to the outside such that the arising sound field of the transducer has a greater divergence and a larger angular range is insonated by one transmission pulse. As a result, an inspection task with many parallel inspection functions can be carried out using the inspection method according to the invention with a significantly reduced sensor system complexity in comparison with systems where each inspection function is realized by a dedicated probe.

Moreover, a change in a mean insonation angle 440 of the angular range 445 can be brought about by delayed driving. Here, the mean insonation angle 440 marks the angle that arises as the mean value of the limits (e.g., at −6 dB of the maximum amplitude) of the angular range 445.

The mean insonation angle 440 can be changed in a similar manner to when phased-array systems are used. However, in contrast to inspection methods with phased-array technology, the mean insonation angle of the inspection method according to the invention need only be set once and the associated sound field can be maintained for the entire inspection. Since a defocused sound field is preferably worked with in the present invention, many inspection angles can already be taken into account using only one mean insonation angle 440 of the transducer 401, without having to implement a respective new setting of the sound field for a certain inspection angle. Consequently, the inspection method according to the invention allows significantly simpler and more expedient device technology than inspection methods that operate using phased-array technology.

Discrete inspection angles (e.g., 0°, 35°, 55° and 70°) can be selected within the scope of the inspection method according to the invention, particularly in the case of reception, by virtue of, for example, only the echo signals of individual inspection angles being evaluated during the digital data processing.

The transducer 401 always insonates an angular range in the material during the inspection method according to the invention, and so a certain reference point in the material, which generates a signal in the case of a first transmission pulse, is still able to respond even in the case of a subsequent transmission pulse under certain circumstances. A reference point can consequently cause a plurality of contributions, which can be added in phase and with a corrected propagation time during the evaluation of the digital data. Consequently, positions of defects in the material can be determined by way of taking account of destructive and constructive interference.

A multiplicity of electronic assemblies, which facilitate, e.g., a delay control, a summation of the reception signals or data compression, can be dispensed with in the inspection method according to the invention since these functions can be realized by software that processes the digital data. Therefore, both the reception chain and the transmission chain each have a comparatively simple structure.

In an advantageous embodiment, the transducer 401 corresponds to the transducer 100 such that the transducer elements 410 are disposed on a circular arc of a virtual circle in order to approximate a sector of an elementary wave so that, for example, simplified algorithms that are restricted to point sources can be used.

In another advantageous embodiment, the ultrasonic probe system 400 in the inspection method according to the invention corresponds to an ultrasonic probe system 300 with a trapezoid-like transducer arrangement 200, as described further above. Accordingly, three transducers 201, 202, 203 are used in this embodiment, the transducer elements of said transducers each being disposed along the movement direction, with the movement direction being parallel to the bases of the virtual trapezoid. Preferably, the second transducer is disposed along the shorter base of the virtual trapezoid, wherein a longer delay path of the second transducer can also be obtained by way of an arrangement above the shorter base. In particular, the three transducers 201, 202, 203 are driven in such a way that they emit a transmission pulse at the same time, wherein a material region, i.e., a volume region in the material 420, is insonated by one sound field in each case; i.e., the sound fields are not overlaid in space. The pulse repetition frequency can be 4 kHz, for example, or the pulses can be transmitted in location-synchronous fashion, i.e., every 3 mm, for example. The sound of the three transducers 201, 202, 203 is reflected (echo) at the back wall and/or at defects in the material region and said sound can be recorded by the three transducers 201, 202, 203 in parallel within the scope of a multichannel operation. The reception signals are digitized and processed further, wherein the reconstruction algorithm takes account of the inspection speed of the movement and allows an assignment of the reception signals that is accurate in space.

In this embodiment, work in the inspection method according to the invention is carried out according to the principle of ultrasonic multichannel technology, in which a plurality of transducers introduce the sound used for inspection purposes. Preferably, the multichannel ultrasonic device 450 is equipped with a preamplifier, which amplifies the reception signals from the transducer elements, and an interface which communicates between the multichannel ultrasonic device and a computer 470, and comprises respectively one analog-to-digital converter per channel, which serves to digitize the analog echo signals and prepare the inspection data from a measurement point of view. By way of a fast network connection, the multichannel ultrasonic device can transmit received signals to a computer with digital signal processing, where the signals are evaluated. Moreover, by way of a clock generator 460, the computer can obtain signals for detecting a path from a position encoder 310 disposed in the vicinity of the transducers. In addition to a multichannel device, a plurality of single-channel devices, which are able to be driven in parallel, could also be connected to the transducers. To this end, the single-channel devices should be synchronized in such a way that the transducer elements can be triggered at the same time.

What can be achieved by virtue of the transducers 201, 202, 203 being oriented in such a way that they sound away from the interior of the virtual trapezoid is that the soundwaves emitted by every one of the transducers are overlaid as little as possible with the soundwaves from the other two transducers. While the second transducer sounds directly to the surface of the material, the first transducer sounds predominantly counter to the movement direction and the third transducer sounds predominantly in the movement direction 430 (or vice versa). The angular range 445 covered by the first or the third transducer preferably comprises the insonation angles from +33° to +80°, particularly preferably from +35° to +70°, or from −33° to −80°, particularly preferably from −35° to −70°, in this case. By way of the choice of the angle of incidence on the coupling face in the probe wedge, it is possible to generate transverse waves, in particular, by the first and the third transducer. The soundwaves emitted by the second transducer have a mean insonation angle of 0°, in particular. The latter is surrounded by an angular range, which preferably comprises the insonation angles from −33° to +33°, particularly preferably from −20° to +20°. The second transducer preferably generates longitudinal waves.

As already described further above, how the angles of the first and third transducer 201, 203 must be implemented in relation to the surface to be examined depends on the intended angular range, the material of the probe wedge (typically acrylic glass) and the material to be examined (e.g., steel for rail inspection vehicles). The internal angles at the shorter base of the virtual trapezoid must be chosen accordingly.

As a result of the simultaneous insonation of the entire relevant material region under all desired insonation angles with the aid of a defocused sound field and as a result of the parallel recording of data by each transducer element, which data can subsequently be prepared while taking the inspection speed into account using a reconstruction algorithm and be assembled to form a results image, maximum inspection speeds of up to 100 km/h without a restricted resolution are facilitated by the embodiment according to the invention of the inspection method. In contrast thereto, only slow inspection speeds of no more than 10 km/h are achieved in inspection methods with phased-array systems, where new focusing and a new transmission procedure are required for each inspection angle.

As a result of the transducer arrangement 200 according to the invention, all insonation angles 440 that are of relevance to the inspection of a material, particularly rails, can be realized at the same time within the scope of the inspection method according to the invention. In the present invention, the inspection angles are preferably selected when receiving the soundwaves that were reflected at the back wall and/or at defects in the material. As a result, great flexibility in relation to conventional inspection methods is achieved by the present invention since different forms of the material to be examined (e.g., the rail geometry) and different fault types can be taken into account by way of an adaptation of the inspection angles. In addition to the position of the fault, the type of fault and its extent, in particular, are detectable, also on the basis of its reflection behavior.

In order to realize the relatively broad angular ranges 445, the use of transducers that are convexly curved in relation to the surface of the material 420 such that the sound field diverges in the direction toward the surface is advantageous, as provided by the transducers 100 according to the invention, for example. Additional or alternative sound field broadening can be achieved by delayed driving of the individual transducer elements of a transducer so that the individual soundwaves are transmitted with a slight delay.

For an assignment of the echo signals with an accurate location, it is advantageous if the transducers 201, 202, 203 of the transducer arrangement 200 are securely attached in the ultrasonic probe system such that the internal angles of the virtual trapezoid and the distance between said transducers and from the inspection surface are known. The distances are preferably provided with an accuracy, the magnitude of which corresponds to a quarter wavelength (λ/4) of the ultrasonic pulse used for the inspection—as measured in the material. Preferably, the employed wavelength is approximately 1.6 mm, and so an accuracy of approximately 0.4 mm should be obtained. The known values can be transmitted into the reconstruction algorithm as parameters and thus be included in the evaluation of the digital data.

The reconstruction algorithm preferably takes account of the path position and the speed at the time of reception of the sound field echo, the positioning of the transducers and the convex curvature of the transducers relative to the material should the latter be present. The maximum achievable resolution when presenting the results is improved by taking account of the inspection speed as a result of the speed-dependent offset (e.g., approximately 4 mm at 60 km/h on a UIC60 rail) of the ultrasonic probe system on the material surface during the propagation time of the sound through the material being able to be corrected. The independence of the inspection result from the speed is important for the inspection of rails using rail vehicles, in particular, since only at a speed of more than 70 km/h do the latter not impede the regular rail traffic as a result of the inspection.

Moreover, an image presentation of the inspection result, in which the amplitude and the phase of the reception signal are taken into account, can be realized by the reconstruction algorithm. The position and form of the detected fault display can be converted into an image by application of image presentation algorithms that are conventional for ultrasonic inspection, for example by B-scan superposition into a P-scan in side view (cf. DIN EN ISO 5577), with superimposed inspection functions. For a presentation of the inspection results, the computer is preferably connected to one or more monitors.

Reference is made to the fact that the features presented herein for one embodiment are exemplary to the specific embodiment and can be used in combination with other embodiments disclosed herein.

LIST OF REFERENCE SIGNS

100 Transducer
110 Transducer elements
120 Virtual circle
130 Sector of an elemental wave
131 Wavefront
140 Virtual point source
150 Center angle
200 Transducer arrangement
201 First transducer
202 Second transducer
203 Third transducer
210 Transducer elements
212 Direction
213 Sound direction
260 Virtual trapezoid
270 Internal angle at the shorter base
280 Probe
290 Probe wedge
300 Ultrasonic probe system
310 Position encoder
400 Ultrasonic probe system
401 Transducer
410 Transducer elements
420 Material to be inspected
430 Movement direction
440 Mean insonation angle
445 Angular range
450 Ultrasonic device
460 Clock generator
470 Computer

The invention claimed is:

1. Transducer arrangement (200) for an ultrasonic probe system, comprising a first, a second and a third transducer (201, 202, 203) for transmitting and receiving soundwaves, wherein
    each transducer comprises at least three transducer elements (210) and wherein,
    in a cross section, the transducer elements (210) of the second transducer (202) are disposed substantially along a straight line that extends parallel to the bases of a virtual trapezoid (260), the transducer elements of the first and of the third transducer (201, 203) being substantially disposed along the non-parallel legs thereof wherein each transducer is aligned in such a way that it can sound entirely or at least partly along a direction that extends from the longer base of the virtual trapezoid to the shorter base of the virtual trapezoid.

2. Transducer arrangement according to claim 1, wherein said at least three transducer elements (110) are disposed on a circular arc of a virtual circle (120) such that soundwaves emitted by the transducer elements (110) are overlaid in such a way that they approximate a sector of an elementary wave (130) with a virtual point source (140), wherein the virtual point source (140) is located at the center of the virtual circle (120).

3. Transducer arrangement according to claim 1, wherein the second transducer (202) is disposed along a longitudinal direction of the cross section between the first and third transducer (201, 203), and/or wherein the second transducer (202) is disposed in the interior of the virtual trapezoid (260) so as to sound away from the longer base of the virtual trapezoid (260), and/or wherein the transducer elements (210) of the second transducer (202) are substantially disposed along the shorter base of the virtual trapezoid (260).

4. Transducer arrangement according to claim 1, wherein each transducer comprises 3 to 16 transducer elements (210).

5. Transducer arrangement according to claim 1, wherein the internal angles (270) at the shorter base of the virtual trapezoid (260) each have a magnitude of 95° to 175°.

6. Transducer arrangement according to claim 1, wherein the legs of the virtual trapezoid (260) each correspond to a tangent at the center of the circular arc on which the transducer elements (210) of the first and third transducer (201, 203) are disposed and the straight line corresponds to a tangent at the center of the circular arc on which the transducer elements (210) of the second transducer (202) are disposed.

7. Ultrasonic probe system (300) comprising a transducer arrangement according to claim 1, wherein the transducer arrangement (200) is housed in a single probe (280), and wherein the transducer arrangement (200) is divided among three probes, which each receive one of the transducers.

8. Ultrasonic probe system according to claim 7, wherein the probe or probes (280) have a probe wedge (290), which models the shape of the transducers (201, 202, 203) and the transducer arrangement (200) in such a way that whole area adhesive bonding between the probe wedge (290) and one side of the transducers (201, 202, 203) is facilitated, wherein the transducers (201, 202, 203) are disposed so as to sound into the probe wedge (290).

9. Ultrasonic probe system according to claim 7, comprising a position encoder (310), wherein the position encoder (310) is attached in the vicinity of the transducer arrangement (200) and connected to the latter.

10. Inspection method for detecting defects in a material (420), comprising:
moving an ultrasonic probe system (400) along a surface of the material (420) in a movement direction (430), wherein
the ultrasonic probe system (400) comprises a transducer (401) that has an arrangement of at least three transducer elements (410) along the movement direction (430), wherein
high-frequency transmission pulses, which are generated by the transducer elements (410) of the transducer (401), are coupled into the material (420), wherein
echo signals are received in parallel by all transducer elements (410) of the transducer (401), wherein the echo signals are respectively caused by reflection of the input-coupled transmission pulses at a defect in the material (420), and wherein
the analog echo signals are converted into digital data, which are then stored and evaluated for the purposes of determining the position of the defect in the material (420), wherein
the number of transducer elements of the transducer along the movement direction (430) experiences a virtual increase on account of the movement and the evaluation of the digital data, wherein
the virtual increase is realized by way of the assignment of path positions to the input-coupled transmission pulses and/or the received echo signals.

11. Inspection method according to claim 10, wherein the path between two transmission pulses traversed by the transducer (401) on account of the movement is detected and a path position is respectively assigned to the transmission pulses and the received echo signals.

12. Inspection method according to claim 11, wherein the path between two transmission pulses is detected with an accuracy of at least $\lambda/4$, where $\lambda$ describes the wavelength in the material (420) of the soundwaves emitted by the transducer elements (410).

13. Inspection method according to claim 10, wherein the transducer (401) insonates an angular range (445) in the material, wherein the angular range (445) covers a plurality of insonation angles defined in relation to a perpendicular of the movement direction (430) extending through the center of the transducer (401) and wherein the angular range (445) comprises insonation angles from −33° to +33°, should the transducer (401) generate longitudinal waves and the angular range (445) comprises insonation angles from +33° to +80°, should the transducer (401) generate transverse waves.

14. Inspection method according to claim 13, wherein the transducer elements (410) of the transducer (401) are driven with a slight delay such that the superposition of the soundwaves of the transducer (401) influences the insonated angular range (445) in the material.

15. Inspection method according to claim 13, wherein the insonated angular range (445) remains constant during the inspection method, and/or wherein the delayed driving leads to a broadening of the insonated angular range (445), and/or wherein the delayed driving leads to change in a mean insonation angle (440) of the angular range (445).

16. Inspection method according to claim 10, wherein the ultrasonic probe system is an ultrasonic probe system according to claim 9 and wherein each of the first, second and third transducer (201, 202, 203) correspond to the transducer (401), and wherein the first and the third transducer (201, 203) generate transverse waves and wherein the second transducer (202) generates longitudinal waves.

17. Inspection method according to claim 16, wherein each transducer (201, 202, 203) is connected to a multichannel ultrasonic device (450) or a plurality of single-channel ultrasonic devices (450), wherein the ultrasonic devices (450) transfer signals via a fast network to a computer (470) with digital signal processing and wherein the computer (470) receives, via a clock generator (460), signals for detecting a path from a position encoder (310) attached in the vicinity of the transducer arrangement (200).

18. Inspection method according to claim 10, wherein the evaluation is implemented by way of signal averaging with a corrected propagation time and in-phase addition of reference points and/or with a path detection being taken into account.

* * * * *